US012573214B2

(12) United States Patent
Friedrichs et al.

(10) Patent No.: US 12,573,214 B2
(45) Date of Patent: Mar. 10, 2026

(54) CHILD SEAT DETECTION FOR A SEAT OCCUPANCY CLASSIFICATION SYSTEM

(71) Applicant: Aptiv Technologies AG, Schaffhausen (CH)

(72) Inventors: Klaus Friedrichs, Dortmund (DE); Monika Heift, Schwelm (DE)

(73) Assignee: Aptiv Technologies AG, Schaffhausen (CH)

( * ) Notice: Subject to any disclaimer, the term of this patent is extended or adjusted under 35 U.S.C. 154(b) by 351 days.

(21) Appl. No.: 18/341,664

(22) Filed: Jun. 26, 2023

(65) Prior Publication Data

US 2024/0013556 A1    Jan. 11, 2024

(30) Foreign Application Priority Data

Jul. 7, 2022    (EP) ..................................... 22183633

(51) Int. Cl.
| | |
|---|---|
| *G06V 20/59* | (2022.01) |
| *B60N 2/00* | (2006.01) |
| *G06V 10/75* | (2022.01) |
| *G06V 10/764* | (2022.01) |

(Continued)

(52) U.S. Cl.
CPC ........... *G06V 20/593* (2022.01); *B60N 2/003* (2023.08); *G06V 10/75* (2022.01); *G06V 10/764* (2022.01); *G06V 10/774* (2022.01); *G06V 10/82* (2022.01); *B60N 2210/00* (2023.08)

(58) Field of Classification Search
CPC .... G06V 20/593; G06V 10/75; G06V 10/764; G06V 10/774; G06V 10/82; G06V 10/761; B60N 2/003; B60N 2210/00
See application file for complete search history.

(56) References Cited

U.S. PATENT DOCUMENTS 11,193,312 B1 * 12/2021 Weng ...................... B60R 25/01

OTHER PUBLICATIONS

Schroff, Florian, Dmitry Kalenichenko, and James Philbin. "Facenet: A unified embedding for face recognition and clustering." Proceedings of the IEEE conference on computer vision and pattern recognition. (Year: 2015).*

(Continued)

*Primary Examiner* — Ross Varndell
(74) *Attorney, Agent, or Firm* — Harness, Dickey & Pierce, P.L.C.

(57) ABSTRACT
Disclosed are safety improvements for vehicles, including methods and systems of child seat detection in collaboration with a seat occupancy classification system. Corresponding systems, vehicles, and computer programs are also presented. In an aspect, a method includes receiving a current image showing a region of a vehicle seat currently captured inside the vehicle and retrieving one or more reference images, wherein at least one reference image is a previously stored first reference image of the vehicle seat being unoccupied. The method further includes determining a seat state of the vehicle seat by processing the current image and one or more reference images with a pre-trained machine learning classification network and determining, based on an output from the network, the seat state indicating at least whether the vehicle seat in the current image includes a mounted child seat. Finally, the method forwards the seat state to the seat occupancy classification system.

18 Claims, 7 Drawing Sheets

(51) Int. Cl.
  *G06V 10/774*          (2022.01)
  *G06V 10/82*           (2022.01)

(56)                    References Cited

OTHER PUBLICATIONS

Da Cruz, Steve Dias, et al. "Illumination normalization by partially impossible encoder-decoder cost function." Proceedings of the IEEE/CVF Winter Conference on Applications of Computer Vision. (Year: 2021).*
"Extended European Search Report", EP Application No. 22183633. 1, Nov. 7, 2022, 12 pages.
Baaj, Adil , "Keras Tutorial: Content Based Image Retrieval Using a Convolutional Denoising Autoencoder", Sep. 14, 2017, 15 pages.
Benhur, Sean , "A Friendly Introduction to Siamese Networks—Towards Data Science", Sep. 2, 2020, 10 pages.
Liu, Dan , et al., "Open Set Face Recognition Using Adaboost and Geometric Transformation", Oct. 2008, 8 pages.

* cited by examiner

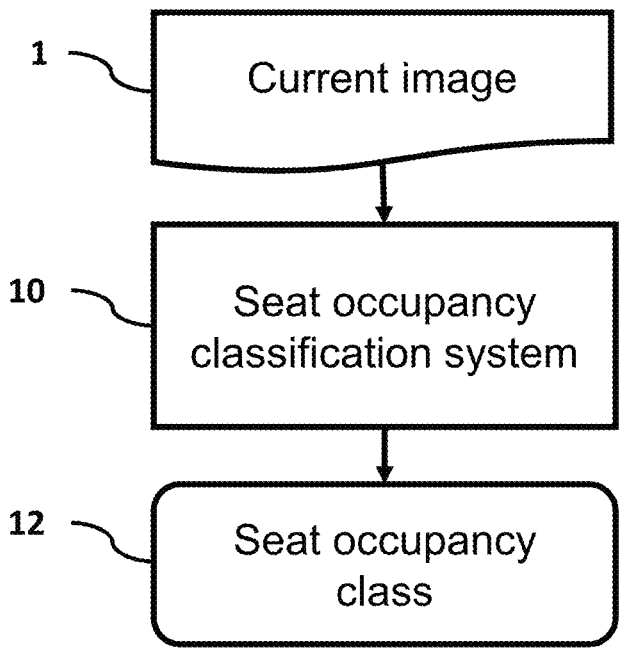
Fig. 1 *(prior art)*
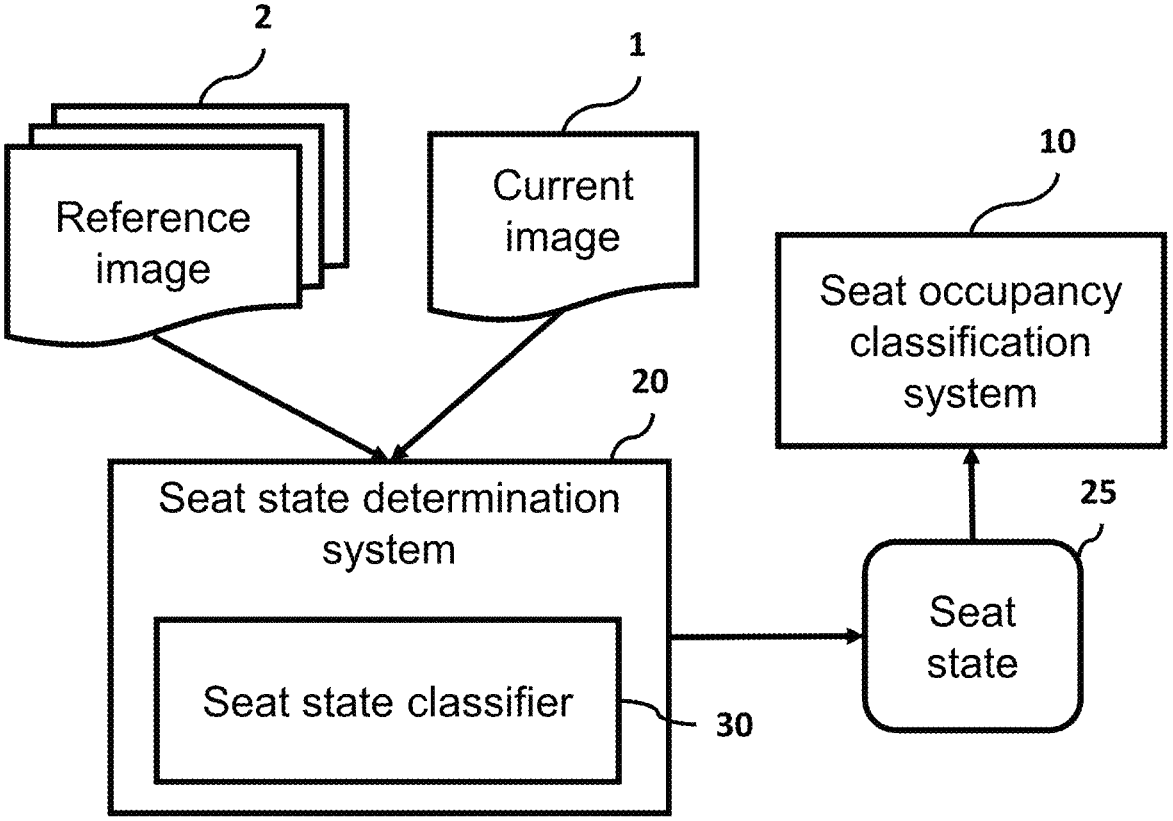
Fig. 2

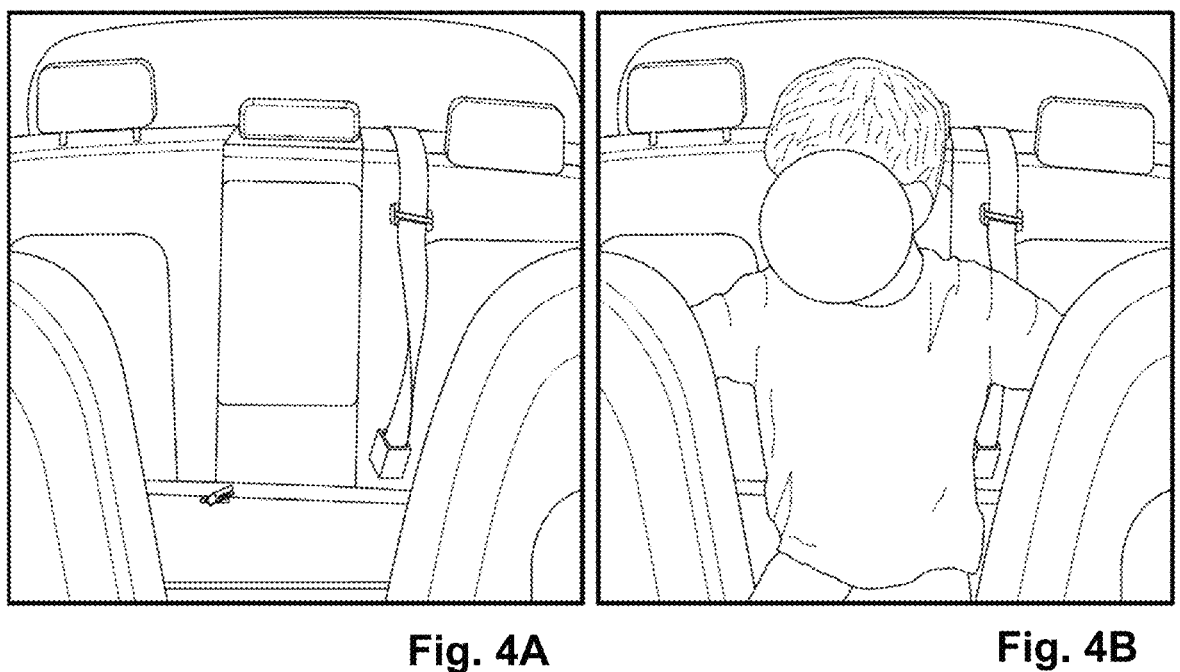
Fig. 4A                                    Fig. 4B
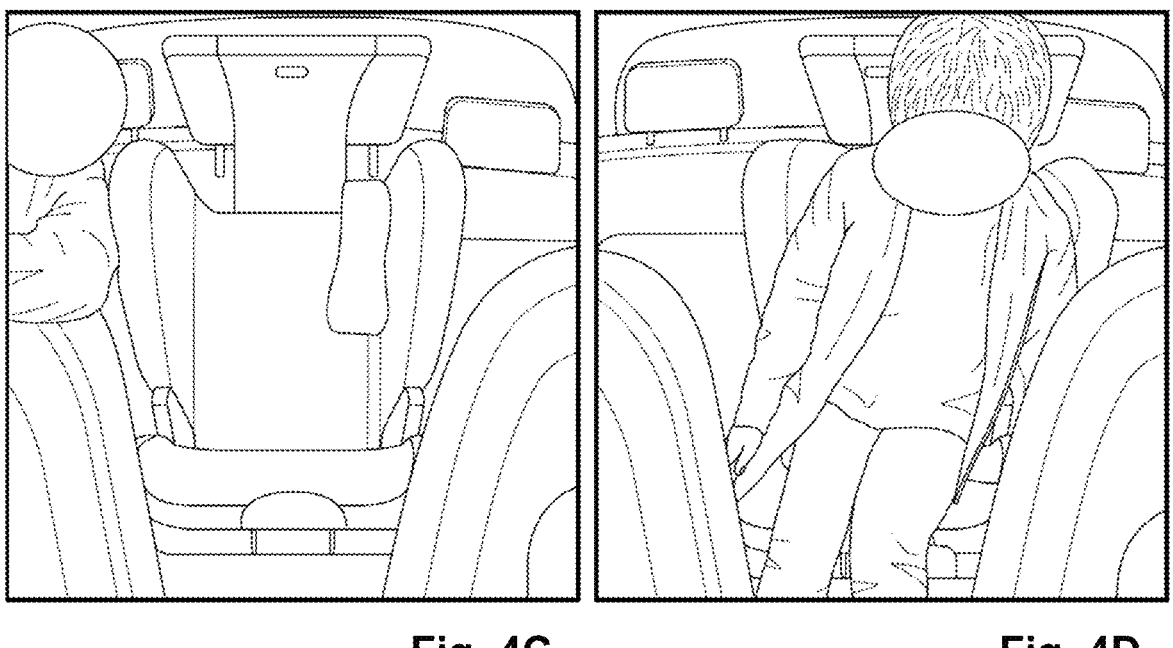
Fig. 4C                                    Fig. 4D

CHILD SEAT DETECTION FOR A SEAT OCCUPANCY CLASSIFICATION SYSTEM

INCORPORATION BY REFERENCE

This application claims priority to European Patent Application No. EP22183633.1, filed Jul. 7, 2022, the disclosure of which is incorporated by reference in its entirety.

BACKGROUND

Smart vehicles, such as smart cars, smart busses, and the like, significantly improve the safety of passengers. One task in such smart cars is seat occupancy detection, which aims at detecting persons, objects, child seats or the like placed on a seat.

Early seat occupancy detection systems were built on weight sensors for detecting weights on seats. More recent seat occupancy detection systems alternatively or additionally process images taken by cameras in the vehicle for child seat detection. Conventional or machine learning algorithms are used to classify the occupancy states of the vehicle seats. This classification is used, e.g., for controlling safety means in the car, such as airbags or the like.

Since some safety means have to be controlled differently for adults and children, there is a need for reliably detecting whether seats are occupied by an adult or a child.

SUMMARY

The present disclosure generally relates to safety improvements for vehicles (e.g., smart vehicles, cars, trains, busses, ships, and the like). Aspects include methods and systems of child seat detection in collaboration with a seat occupancy classification system in vehicles that improve safety. In this context, methods, systems and computer program products are presented, as is a computerized method of child seat detection for a seat occupancy classification system in a vehicle. The method comprises receiving a current image showing a region of a vehicle seat currently captured inside of the vehicle and retrieving one or more reference images, wherein at least one reference image is a previously stored first reference image of the vehicle seat being unoccupied. The method further comprises determining a seat state of the vehicle seat by processing the current image and one or more reference images with a pre-trained machine learning classification network and determining, based on an output from the machine learning classification network, the seat state indicating at least whether the vehicle seat in the current image comprises a mounted child seat. Finally, the method forwards the seat state to the seat occupancy classification system. A corresponding system, vehicle, and computer program are also presented.

Another aspect concerns a system of child seat detection for a seat occupancy classification system in a vehicle that is adapted to perform the methods described herein.

Yet another aspect concerns a vehicle that comprises a camera, a seat occupancy classification system and the herein described system of child seat detection.

Finally, a computer program is presented that comprises instructions which, when the program is executed by a computer, cause the computer to carry out the methods described herein.

These and other objects, embodiments and advantages will become readily apparent to those skilled in the art from the following detailed description of the embodiments having reference to the attached figures, the invention not being limited to any particular embodiments.

BRIEF DESCRIPTION OF THE DRAWINGS

The foregoing and further objects, features and advantages of the present subject matter will become apparent from the following description of exemplary embodiments with reference to the accompanying drawings, wherein like numerals are used to represent like elements, in which:

FIG. 1 presents a flow chart of the prior art seat occupancy classification system in a vehicle.

FIG. 2 is a basic flow chart of the method disclosed herein.

FIGS. 4A to 4D present example images captured by a camera in the vehicle that serve as input to the method disclosed herein.

DETAILED DESCRIPTION

Figure 3:
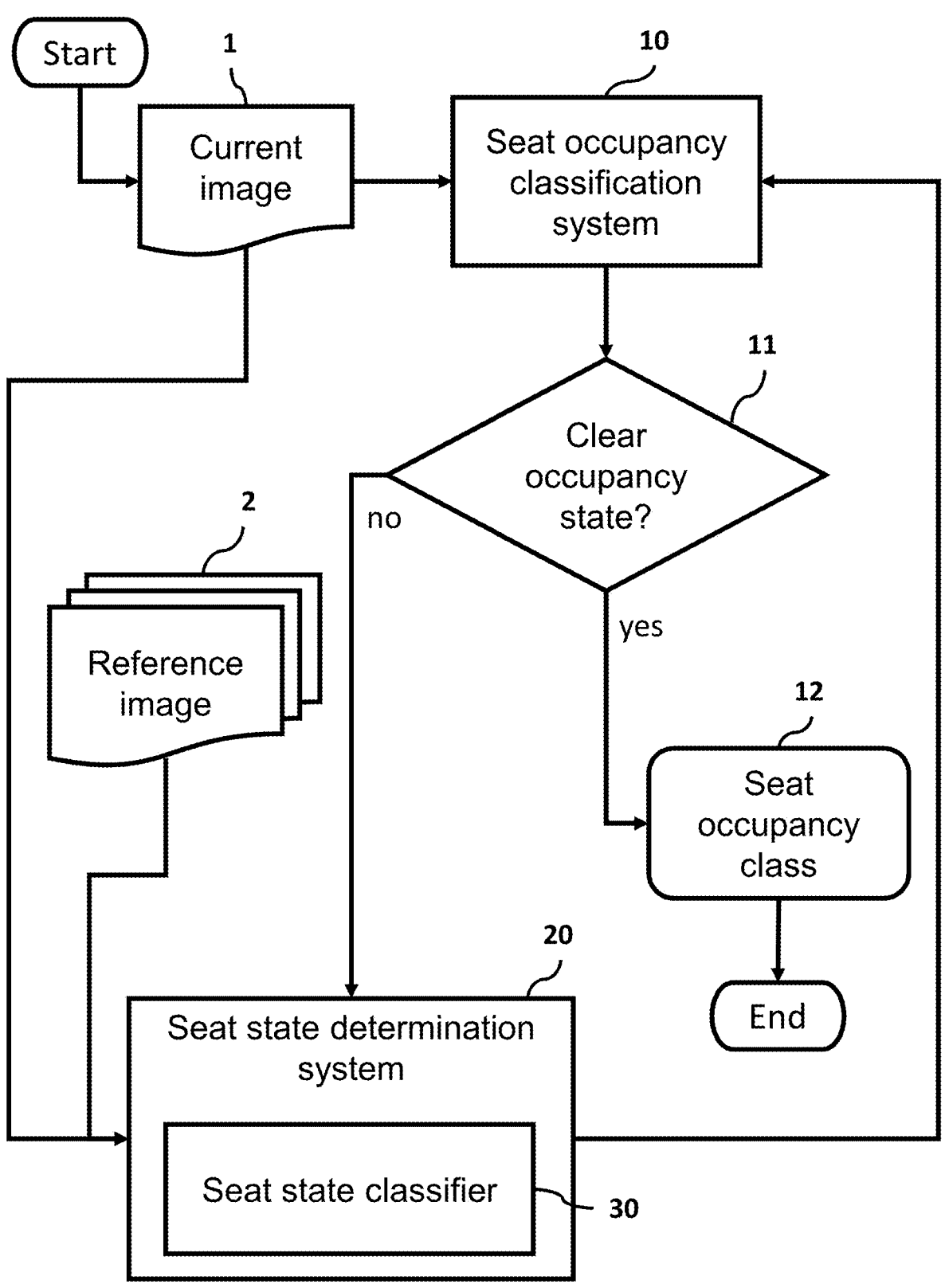
FIG. 3 is an embodiment of the method disclosed herein working in collaboration with the seat occupancy classification system.

The present disclosure generally relates to safety improvements for cars and, in particular, methods and systems of child seat detection in collaboration with a seat occupancy classification system that improve the safety of smart vehicles, such as cars, trains, busses, ships, and the like.

Smart vehicles already improve the safety of passengers as they detect an occupancy state of vehicle. However, it is not only relevant to reliably detect whether a person or object occupies a seat but also whether the person is a child or an adult and/or whether a child seat is mounted in the car.

Especially the decision between an occupied child seat, e.g., a child seat with a child on it, and an adult sitting on a regular seat is highly safety-critical due to its significance for safety means (e.g., safety systems) in the car, such as airbag or seat belt control. For example, an airbag needs to be deployed with reduced pressure or not at all if a child in a child seat is detected. In contrast, ensuring the safety of an adult on a seat may require to apply the normal pressure to the airbag.

The most challenging border case in such a detection scenario is the decision between a child seat occupied by a large child and a probably small person on an unoccupied seat. In the case of a large child in a child seat, important features like face and shoulders appear at approximately the same position in an image captured by a car camera compared to a person on an unoccupied seat. Furthermore, often only small fractions of the child seat itself are visible, as the main part of the child seat is hidden behind the child sitting on it. Hence, a child seat detection system in collaboration with a seat occupancy classification system is provided.

FIG. 1 depicts a general overview of a seat occupancy classification system 10 as currently used in smart vehicles. The seat occupancy classification system 10 may be a machine learning seat occupancy classification system that receives a current image 1. The current image 1 may be received from an onboard camera of the vehicle or may also be provided otherwise, e.g., from an external camera of the vehicle's driver connected to an onboard computing system. An actual image captured by the camera may be pre-processed to receive the current image 1. For example, a region may be determined that shows one vehicle seat and the actual image is cropped to this region. Then, the region of the vehicle seat is received as current image 1. The current image 1 is then inputted into the seat occupancy classification system 10.

The seat occupancy classification system 10 (which is also referred to as seat occupancy classifier in the following) is pre-trained to output a seat occupancy class 12 of a vehicle seat. The seat occupancy class 12 of the seat occupancy classification system 10 may further serve to control one or more safety means (e.g., safety systems) in the vehicle, e.g., airbag regulation and/or seatbelt tensioning control.

Seat occupancy classes may be, for example, unoccupied (or empty) seat, unoccupied child seat, person on seat/child seat, object on seat/child seat, and the like. The seat occupancy classification system 10 may be based on a machine learning method like a gradient boosted tree, a random forest, an artificial neural network, a recurrent neural network, a convolutional neural network, an autoencoder, a deep learning architecture, a support vector machine, a data-driven trainable regression model, a k-nearest-neighbor classifier, a physical model, and/or a decision tree, or a combination thereof.

Although the current seat occupancy classifiers 10 already have a high reliability when detecting objects/person, they sometimes cannot clearly differentiate between a child seat occupied by a large child and a person sitting on a vehicle seat. While theoretically a sufficiently large dataset containing a huge amount of child data in child seats might allow the seat occupancy classifier 10 to learn the difference, in practice the amount of child data is limited and the described case may be misclassified.

FIG. 2 depicts a solution to the above-mentioned problem that does even work with limited occupied child seat training data. A distributed or local computing system implements the computerized method and, in particular, a seat state determination system 20 described hereinbelow. This seat state determination system 20 receives a current image 1, which may be pre-processed and cropped the same way as described before and shows a region of a vehicle seat currently captured inside of the vehicle. Moreover, the seat state determination system 20 retrieves one or more references images 2 that show the vehicle seat being unoccupied. The reference images 2 build the basis for determining whether a child seat is mounted or not.

At least one first reference image 2, which was previously captured and stored, depicts the respective vehicle seat—which is also shown on the current image 1—being unoccupied. In embodiments, the seat state determination system 20 may also retrieve a second reference image 2, which may depict a last detected child seat mounted on the vehicle seat, another previously detected child seat mounted on the vehicle seat, and/or an exemplary child seat in a similar vehicle. Even more reference images 2, depicting further images of different child seats mounted in the vehicle, may be retrieved in further embodiments.

The current image 1 and the one or more reference images 2 are then used to determine a seat state 25 of the vehicle seat. This is done by processing the current image 1 and one or more reference images 2 with a pre-trained machine learning classification network 30, which is also referred to as seat state classifier 30. The pre-trained machine learning classification network 30 may be a neural network or any other suitable machine learning classifier. The output of the seat state classifier 30 may be, for example, a confidence value for a child seat being mounted on the vehicle seat, confidence values for the current image 1 corresponding to each of the reference images 2, a class of the current image 1, e.g., child seat or vehicle seat, and/or a combination of those.

The seat state classifier 30 may be trained remotely before use of the vehicle and applied during use of the vehicle. Use of the vehicle is to be understood as anything that activates the power supply in the vehicle, e.g., unlocking the doors, approaching the vehicle with the key/token for keyless entry systems, driving the vehicle, and the like. The seat state classifier 30 may be based on a gradient boosted tree, a random forest, an artificial neural network, a recurrent neural network, a convolutional neural network, an autoencoder, a deep learning architecture, a support vector machine, a data-driven trainable regression model, a k-nearest-neighbor classifier, a physical model, and/or a decision tree, or a combination thereof.

In some embodiments, the seat state classifier 30 is based on a Siamese neural network configured to compare the current image to the one or more reference images, wherein the Siamese neural network is based on a plurality of identical convolutional networks, e.g., convolutional neural networks trained to have each identical model parameters, that determine embeddings of the current image 1 and the one or more reference images 2. A specific example of such a Siamese neural network is described further below with respect to FIG. 6.

Based on the output of the machine learning classification network 30, the seat state 25 is determined by the seat state determination system 20. The seat state 25 indicates at least whether the vehicle seat in the current image comprises a mounted child seat or not, e.g., the seat state 25 may be given by a binary value. In some embodiments, the seat state 25 may take a plurality of states, such as vehicle seat, child seat 1, child seat 2, uncertain state, and the like. The seat state 25 may also comprise additional information, for example, relating to a confidence value of the decision, a time stamp, a vehicle seat location, and/or similar information. The seat state 25 is then forwarded to the seat occupancy classification system 10 which may then adapt a previously detected occupancy class or determine the occupancy class of the vehicle seat based on the provided seat state 25.

Although the embodiments presented herein focus on determining the seat state 25 of one seat region in the vehicle, the seat state 25 may be determined for multiple seats or each vehicle seat inside the vehicle. This may be done in parallel or also subsequently.

FIG. 3 schematically depicts functionality of the seat occupancy classification system 10 and the seat state determination system 20 with the seat state classifier 30. The seat occupancy classification system 10 receives the current image 1 and attempts to determine an occupancy class based on the current image 1. If the occupancy class is clear (yes-branch of branching 11), e.g., the seat occupancy classification system 10 has a high confidence on the decision on the occupancy class, the seat occupancy class 12 is outputted, e.g., to an airbag or seat belt control.

However, if the occupancy class is unclear (no-branch of branching 11), the seat state determination system 20 is executed. An unclear occupancy class may for example occur if the seat occupancy classification system has previously detected a child seat, but afterwards a person. Hence, it is unclear whether the child seat has been removed before the person entered the car. Additionally or alternatively, the unclear occupancy class may occur if the seat occupancy classification system cannot decide with a high confidence on the seat occupancy class.

The seat state determination system 20 then processes the current image 1 and one or more reference images 2 with the seat state classifier 30. Based on the output of the seat state classifier 30, a seat state 25 is determined that is subsequently transmitted to the seat occupancy classification system 10. The seat occupancy classification system 10 may then run a seat occupancy classification process another time with the new information about the seat state 25 and return a seat occupancy class 12 to one or more safety systems of the vehicle.

FIGS. 4A, 4B, 4C, and 4D depict example images of the region of a central backseat of a car. In this example, the onboard camera may provide images with a broader view, but pre-processing may have cropped the captured images to the images as shown in the FIGS. 4A to 4D. This pre-processing and cropping may be based on manually defined regions in the vehicle, e.g., a manually defined region for each of the four or five (or any other number of) car seats. Alternatively, a machine learning model may be applied in order to determine the different regions.

FIGS. 4A to 4D show examples of the image crops. FIG. 4A shows an unoccupied backseat, whereas in FIG. 4B, a person is sitting on the vehicle seat. FIG. 4C depicts a mounted child seat on the backseat, on which in FIG. 4D a child is seated.

For example, FIG. 4A may be the first reference image 2, which was stored previously, and shows the vehicle seat in an unoccupied state. Additionally, the image of FIG. 4C may be the second reference image 2, which depicts the last mounted child seat on the vehicle seat. If FIG. 4B is the current image 1 taken by the camera shortly before executing the seat classification procedure, the seat determination system 20 will process the images of FIGS. 4A, 4B, and 4C with the seat state classifier 30 and, e.g., receive as output a value of 0 meaning that the seat state classifier 30 classifies the image of FIG. 4B as comprising no mounted child seat.

Otherwise, if the image of FIG. 4D is the current image 1 taken by the camera shortly before executing the seat classification procedure, the seat state classifier 30 classifies the image as comprising the mounted child seat and outputs, e.g. a value of 1. The seat state determination system 20 may then determine the seat state 25 by taking the output of the seat state classifier and forward the output to the seat occupancy classification system. Alternatively, if the seat state classifier outputs a vector of similarity values, the seat state determination system 20 may determine the seat state 25 based on a comparison of these values with each other and/or threshold(s).

Figure 5:
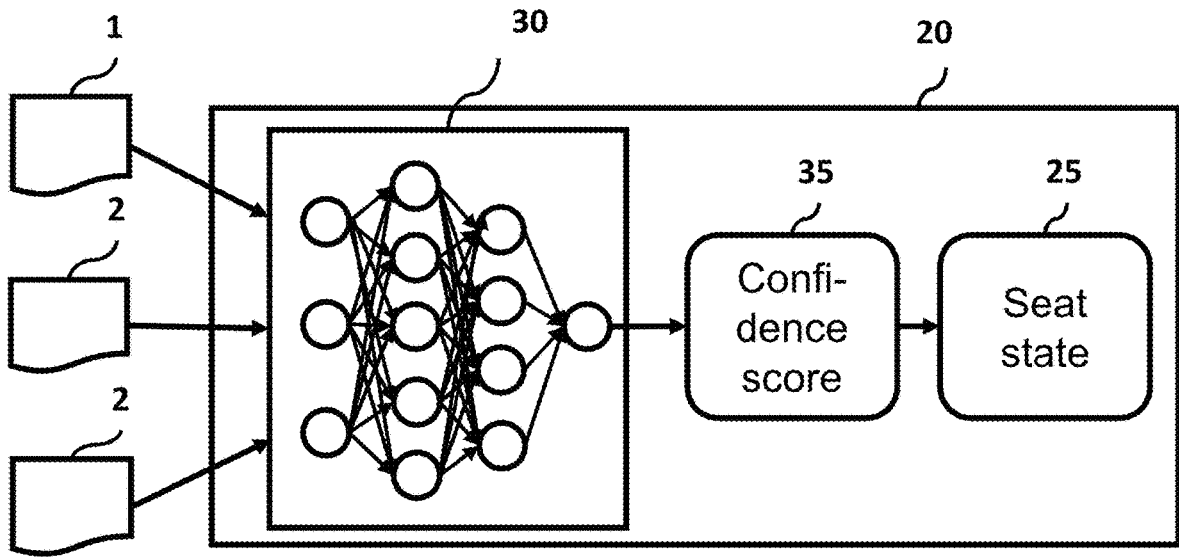
FIG. 5 presents an example of how a seat state determination system for child seat detection may be configured.

FIG. 5 presents an implementation example of the seat state determination system 20. In this example, the seat state classifier 30 is a neural network with a first input channel configured to receive the current image 1 and one or more reference input channels each configured to receive a reference image 2 of the one or more reference images 2. In FIG. 5, two reference input channels are shown but other numbers of reference input channels are possible. In this example, the seat state classifier 30 is trained to output a confidence score 35, e.g., a number between 0 and 100 relating to the confidence that a child seat is mounted on the vehicle seat shown in the current image 1. For example, the seat state classifier 30 may output a confidence score of 95 when the current image is the image of FIG. 4D. The seat state classifier may then also output the classification, e.g., whether there is a mounted child seat or no mounted child seat, based on and along with the confidence score for this classification.

Then, the seat state determination system 20 may determine the seat state 25 based on the confidence score 35 and, if present, the classification result. For example, if the confidence score is 95 for a child seat being mounted, the seat state may be set to 1 indicating that a child seat is mounted. This seat state 25 is then transmitted to the seat occupancy classifier 10. The confidence score 35 may be compared with a threshold to determine the seat state 25. For example, the threshold may be 80. If the confidence score 35 is greater than 80 for a child seat being mounted, the seat state 25 may be set to 1 otherwise to 0. The confidence score 35 may also be included in the seat state 25. The example of FIG. 5 treats the problem of determining a child seat like a common classification task with the advantage of using the additional specific information provided by the one or more reference images.

It may also happen that no clear decision on the seat state is possible, e.g., the seat state is uncertain as, e.g., the confidence value is too low for all reference images 2 input to the seat state classifier 30. Then, the seat state classifier 30 outputs this uncertain seat state and the current image 1 may be stored for a later reference image update process.

Figure 6:
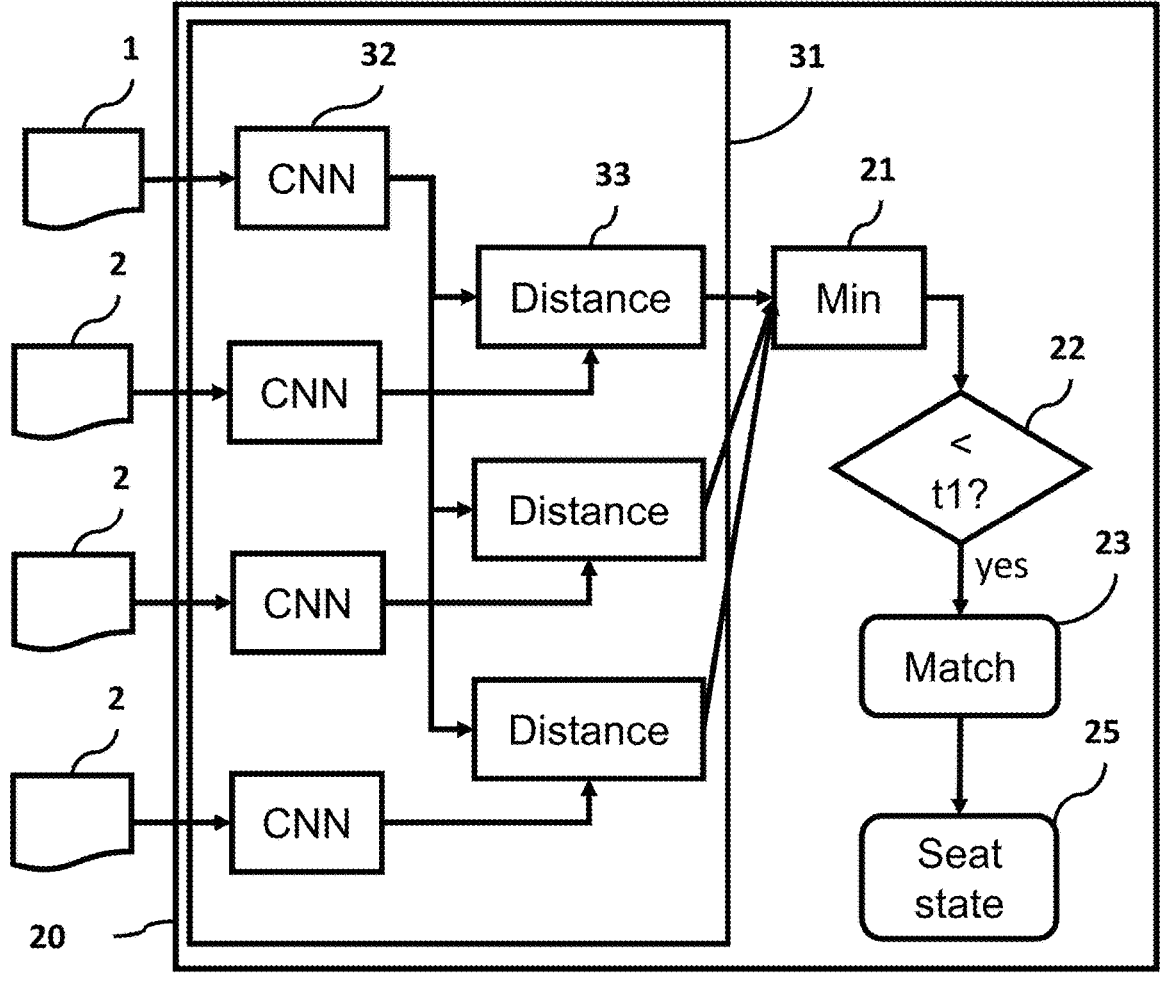
FIG. 6 presents an example of a Siamese neural network as machine learning classifier for child seat detection.

FIG. 6 presents a non-limiting example of a Siamese neural network 31 as machine learning classifier 30 for child seat detection. In this example, the Siamese neural network 31 receives the current image 1 and three reference images 2, e.g., one unoccupied vehicle seat image and two mounted child seat images. The basic Siamese neural network processes the current image 1 and one reference 1. Theoretically, there is not limit and the Siamese neural network 31 can take 5, 10, 20, or any other number of reference images 2 as input to classify the seat shown by the current image 1.

The Siamese neural network 31 is based on a plurality of convolutional networks 32 that determine embeddings of the current image 1 and the one or more reference images 2. An embedding is a dense numerical representation of a real-world object and relationship, expressed as a vector. In this example, an embedding is the low-dimensional representation of an image (or part of it) after processing through the convolutional neural network 32. By computing the embeddings, the Siamese neural network computes comparable output vectors for which distances 33, e.g., Euclidean distances can be calculated. Hence, the Siamese neural network 31 uses the same weights while working in tandem on two different input vectors, e.g., the current image 1 and one of the one or more reference images 2. The embedding of the current image 1 may be computed once and the distances 33 to all other embeddings of the reference images 2 are then determined in parallel or subsequently.

In the example of FIG. 6, the output of the Siamese neural network 31 is composed of three distances 33. The minimum distance of the exemplary three distances 33 is determined in box 21 and compared in the branching 22 with a threshold, also referred to as first threshold or T1. This first threshold may be statistically defined threshold to decide whether the minimum distance 21 between the respective reference image 2 and the current image 1 is sufficiently small to decide on whether a child seat is mounted or not. If so (yes-branch in branching 22), a match 23 with the respective reference image 2 is determined, which is then used to determine the seat state 25.

If the distance 21 is larger than the threshold T1 (not shown), different processes may be taken. For example, the seat occupancy classification system 10 may be informed about the uncertainness in the child seat detection. The seat occupancy system 10 may then prompt the user for input about the seat state. Additionally or alternatively, safety means (e.g., safety systems) may be informed about the uncertainness of the seat state 25.

Figure 7:
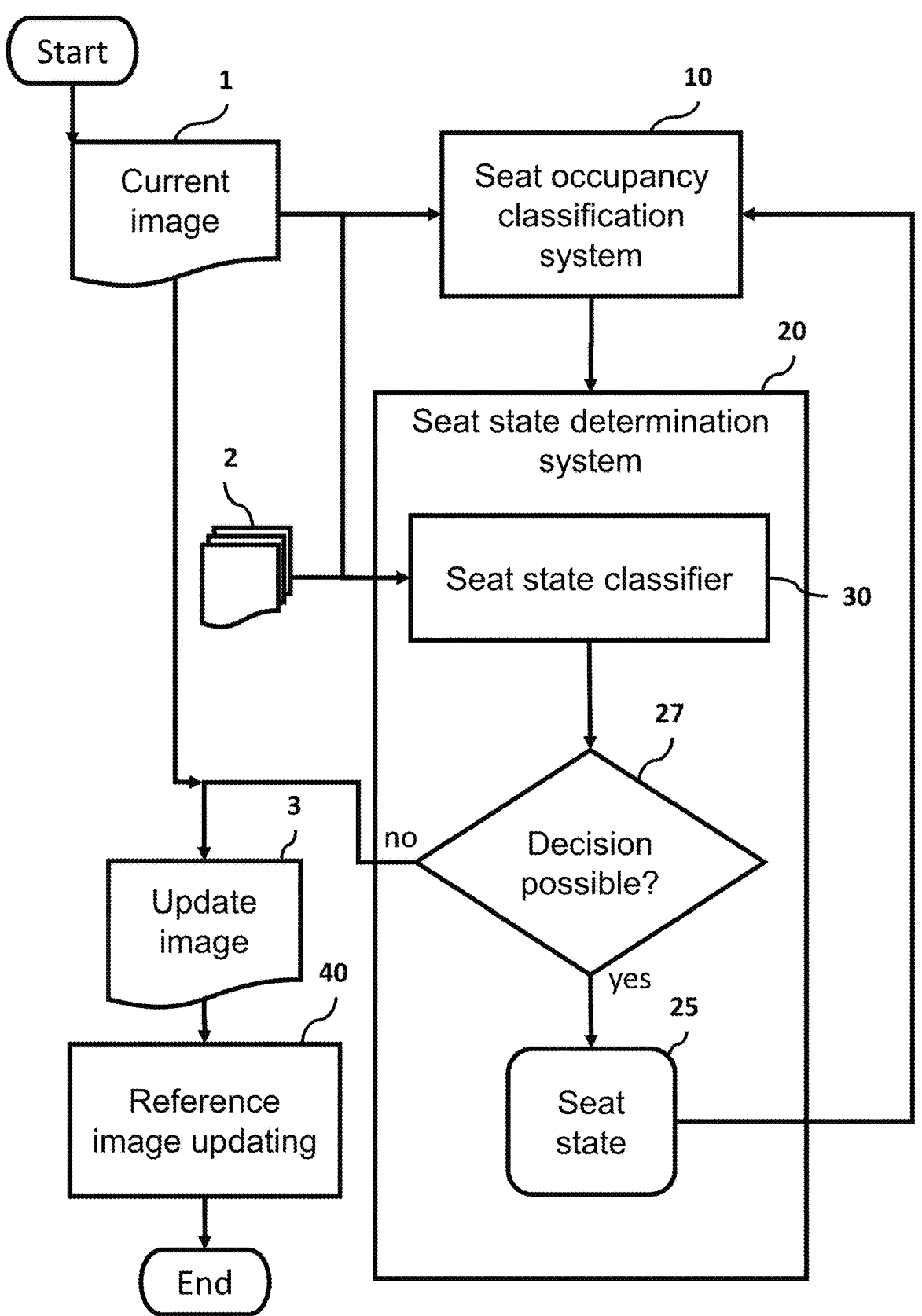
FIG. 7 shows a flow chart depicting a situation when no decision on the seat state is possible leading to a reference image updating process.

FIG. 7 shows a flow chart depicting the situation of an uncertain seat state that may cause a reference image update process. At first, the current image 1 is received by the seat occupancy classification system 10. This may have an unclear occupancy state and call the seat state determination system 20 with the seat state classifier 30, which takes the current image 1 and the one or more reference images 2 as input as described above.

If the decision on a seat state 25, e.g., whether a child seat is mounted or not, is possible (yes-branch of branching 27), e.g., with a confidence that is sufficiently high, then the seat state 25 is transmitted to the seat occupancy classification system 10. If no decision is possible (no-branch of branching 27), e.g. the seat state 25 is uncertain as, e.g. no sufficiently high confidence value is determined for any one of the reference images 2 input to the seat state determination system 20 or the distances of the current image 1 and the references images 2 are not below the given first threshold, the current image 1 is stored as update image 3 for a later reference image update process 40. Additionally (not shown in FIG. 7), the seat state determination system 20 may inform the seat occupancy classification system 10 about the uncertainty in the decision of the seat state 25.

This situation, e.g., when no decision on the seat state is possible, may occur, for example, if the confidence value 35 of the seat state classifier 30 is too low for a decision on the seat state 25 or, if the distance of the embeddings of the current image 1 and each of the reference images 2 is larger than the first threshold when using the Siamese neural network.

The seat occupancy classification system 10 may, in response to receiving no seat state or an uncertainty with respect to the seat state, inform the driver/user of the vehicle that there is an uncertain state with respect to one or more seats in the vehicle. The user may then manually input an occupancy state in order to ensure the safety of the passengers.

An additional reference image update process may be triggered periodically. After a predetermined amount of time has passed, the seat occupancy classification system 10 triggers capturing of current update images. If there are confidential classifications for unoccupied vehicle seat or unoccupied child seat, these newly taken current update images are stored as reference images 2 or replace old corresponding reference images 2.

Figure 8:
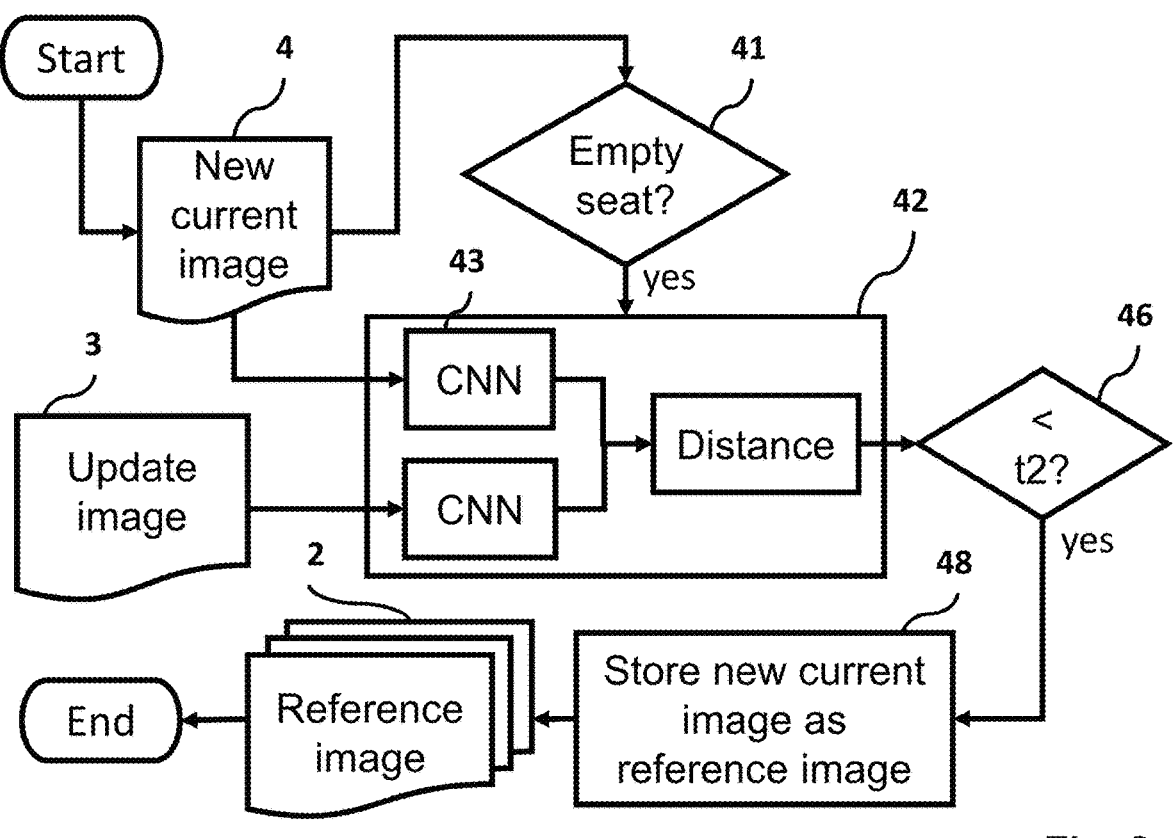
FIG. 8 depicts a flow chart on an example of the reference image updating process.

FIG. 8 is a more detailed example of the reference image update process. This may be triggered by determining, e.g., by the seat occupancy classification system, an unoccupied vehicle seat or an unoccupied child seat on a new current image 4 (yes-branch of branching 41). Examples of such images with unoccupied seats are depicted in FIG. 4A and FIG. 4C. In this example, a Siamese neural network 42 is used for determining whether a reference image shall be updated with the stored update image 3. The Siamese neural network 42 with two identical convolutional neural networks 43 is applied on the new current image 4 and the stored update image 3. For both images, convolutional neural networks determine the embeddings and the Euclidean distance between the two embeddings is calculated. If the distance is smaller than a threshold, also referred to as second threshold or T2 (yes-branch of branching 46), the new current image 3 is stored as a reference image 2 or replaces one stored reference image 2 as depicted with box 48.

In an example embodiment, the Siamese neural network 42 corresponds to the Siamese neural network as shown in FIG. 6. In this embodiment, the Siamese neural network 42 may only differ by the number of input channels, e.g., number of input images on which it can be applied. In another embodiment, the Siamese neural network may be a different Siamese neural network, e.g., the convolutional neural networks 32 and 41 are differently trained and apply different model parameters.

Figure 9:
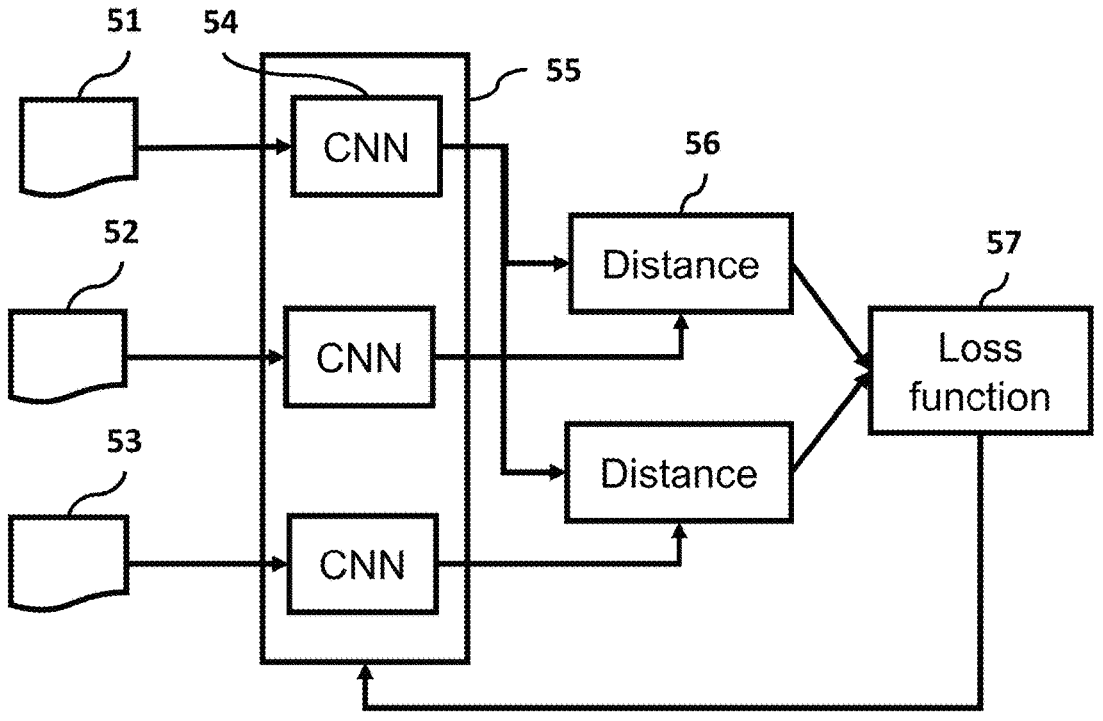
FIG. 9 shows an embodiment of a training of a Siamese neural network.

FIG. 9 shows an embodiment of the training of the Siamese neural network as described above. The Siamese neural network is trained on a plurality of triples of images that each comprise an anchor image 51, a positive match image 52, and a negative match image 53. The triples are used as input to the convolutional neural networks 54 of the Siamese neural network, e.g., the convolutional neural networks 32 of FIG. 6 and/or the convolutional neural networks 43 of FIG. 8. The convolutional neural networks 54 apply the same set of model parameters or weights, which is depicted with the box 55. The convolutional neural networks 54 are trained to calculate embeddings of the input images having a small distance 56 if the images show the same kind of seat in the background, e.g., vehicle seat or mounted child seat, and a large distance 56 if the images show different seat types in the background. This training may be achieved by minimizing the loss function $L=\max(d(a,p)^2-d(a,n)^2+\text{mar-gin},0)$, with $d(a,p)$ being the distance between the anchor image 51 ("$a$") and the positive match image 52 ("$p$"), $d(a,n)$ being the distance between the anchor image 51 ("$a$") and the negative match image 52 ("$n$"), and the margin being a security distance. Based on the loss function, the model parameters or weights 55 are adapted. This is done until the model is sufficiently trained, e.g., determined by comparing the output of the loss function for a plurality of training sequences with a threshold.

The triples for the training of the Siamese neural network 31 and/or 42 comprise at least one of the following setups. In the first setup, the anchor image 51 is an example vehicle seat being occupied, the positive match image 52 is the example vehicle seat being unoccupied, and the negative match image 53 is the example vehicle seat with a mounted child seat being unoccupied. Hence, a triple could be composed of FIG. 4B as anchor image 51, FIG. 4A as positive match image 52, and FIG. 4C as negative match image 53.

In the second setup, the anchor image 51 is an example vehicle seat with a mounted child seat being occupied, the positive match image 52 is the example vehicle seat with the mounted child seat being unoccupied, and the negative match image 53 is the example vehicle seat being unoccupied. Hence, a triple could be composed of FIG. 4D as anchor image 51, FIG. 4C as positive match image 52, and FIG. 4A as negative match image 53.

In the third setup, the anchor image 51 is an example vehicle seat being unoccupied, the positive match image 52 is the example vehicle seat being occupied, and the negative match image 53 is the example vehicle seat with a mounted child seat being occupied. Hence, a triple could be composed of FIG. 4A as anchor image 51, FIG. 4B as positive match image 52, and FIG. 4D as negative match image 53.

In the fourth setup, the anchor image 51 is an example vehicle seat with a mounted child seat being unoccupied, the positive match image 52 is the example vehicle seat with the mounted child seat being occupied, and the negative match image 53 is the example vehicle seat being occupied. Hence, a triple could be composed of FIG. 4C as anchor image 51, FIG. 4D as positive match image 52, and FIG. 4A as negative match image 53.

In some embodiments, the training combines these different triple setups to increase variance and flexibility of the trained model.

The images of the seat being occupied, which are used for training, may be real images taken inside a vehicle and depict a child, an adult, or an object on the seat/child seat. Additionally or alternatively, at least some images of the seat being occupied may be generated by modifying an image of an unoccupied seat or child seat to simulate an occupation of the respective seat.

Figure 10:
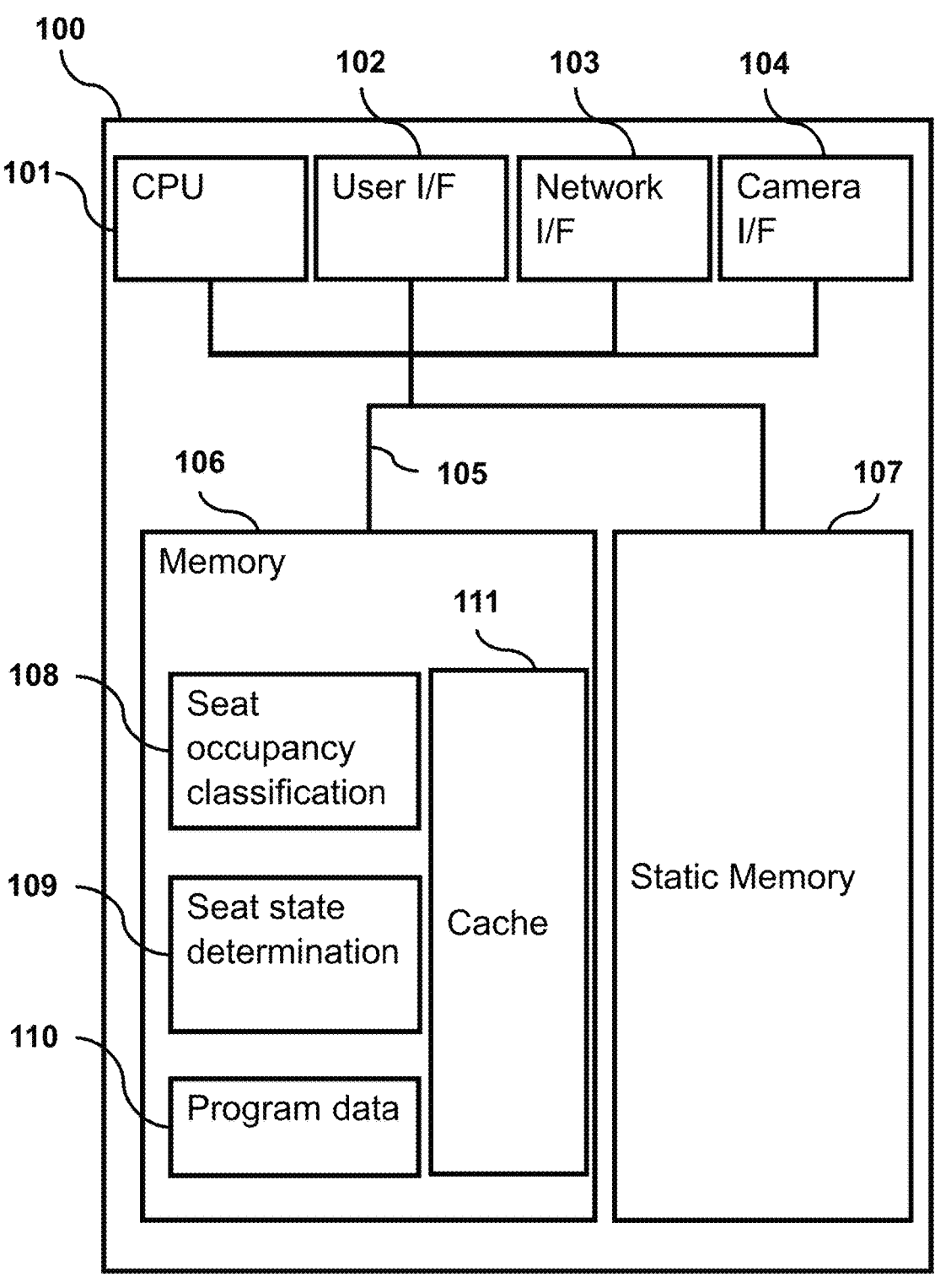
FIG. 10 is a diagrammatic representation of a computing system implementing the functionalities described herein.

FIG. 10 is a diagrammatic representation of internal components (e.g., computer hardware components) of a computing system 100 implementing the functionality as described herein. The computing system 100 may be located in the vehicle and includes at least one processor 101, a user interface 102, a network interface 103 and a main memory 106, that communicate with each other via a bus 105. Optionally, the computing system 100 may further include a static memory 107 and a disk-drive unit (not shown) that also communicate with each via the bus 105. A video display, an alpha-numeric input device and a cursor control device may be provided as examples of user interface 102.

Furthermore, the computing system 100 may also comprise a specified camera interface 104 to communicate with an on-board camera of the vehicle. Alternatively, the computing system 100 may communicate with the camera via the network interface 103. The camera is used for taking the current image 1. The computing system 100 may also be connected to database systems (not shown) via the network interface, wherein the database systems store at least part of the images needed for providing the functionalities described herein.

The main memory 106 may be a random-access memory (RAM) and/or any further volatile memory. The main memory 106 may store program code for the seat occupancy classification system 108 and the seat state determination system 109. The memory 106 may also store additional program data required for providing the functionalities described herein. Part of the program data 110, the seat state determination system 109 and/or the seat occupancy classification system 108 may also be stored in a separate, e.g., cloud memory and executed at least in part remotely. In such an exemplary embodiment, the memory 106 may store the current occupancy and seat states according to the methods describes herein in a cache 111.

According to an aspect, a vehicle is provided. The herein described seat state determination system 20 may be stored as program code 109 and may be at least in part comprised by the vehicle. The seat occupancy determination system 10 may be stored as program code 108 and may also at least in part be comprised by the vehicle. Parts of the program code 108 for the seat occupancy classification system 10 and the program code 109 for seat state determination system 20 may also be stored and executed on a cloud server to reduce the computational effort on the vehicle's computing system 100. The vehicle may also comprise a camera for capturing the current image 1. The camera may also capture the reference images 2. The reference images 2 may be stored internally in the respective computing system 100 of the vehicle. Alternatively, the reference images 2 may also be stored in external databases, such as cloud-based databases.

According to an aspect, a computer program comprising instructions is provided. These instructions, when the program is executed by a computer, cause the computer to carry out the methods described herein. The program code embodied in any of the systems described herein is capable of being individually or collectively distributed as a program product in a variety of different forms. In particular, the program code may be distributed using a computer readable storage medium having computer readable program instructions thereon for causing a processor to carry out aspects of the embodiments described herein.

Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

It should be appreciated that while particular embodiments and variations have been described herein, further modifications and alternatives will be apparent to persons skilled in the relevant arts. In particular, the examples are offered by way of illustrating the principles, and to provide a number of specific methods and arrangements for putting those principles into effect.

In certain embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "include", "having", "has", "with", "comprised of", or variants thereof are used in either the detailed description or the claims, such terms are intended to be inclusive in a manner similar to the term "comprising".

While a description of various embodiments has illustrated all of the inventions and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, the described embodiments should be understood as being provided by way of example, for the purpose of teaching the general features and principles, but should not be understood as limiting the scope, which is as defined in the appended claims.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A method comprising:
receiving a current image showing a region of a vehicle seat currently captured inside of a vehicle;
retrieving one or more reference images, wherein at least one reference image is a previously stored first reference image of the vehicle seat being unoccupied;
determining a seat state of the vehicle seat by:
processing the current image and one or more reference images with a machine learning classification network that has been pre-trained, and
determining, based on an output from the machine learning classification network, the seat state indicating at least whether the vehicle seat in the current image comprises a mounted child seat;
forwarding the seat state to a seat occupancy classification system; and
in response to determining that no decision on the seat state is possible, storing the current image as an updated image for a reference image update process;
wherein the reference image update process includes:
receiving a new current image, wherein the new current image depicts a vehicle seat without a mounted child seat being unoccupied or a vehicle seat with a mounted child seat being unoccupied;
applying a Siamese neural network to compare the new current image with the updated image; and
in response to a Euclidean distance between embeddings of the new current image and the updated image being smaller than a second threshold, storing the new current image as one of the one or more reference images or replacing one of the one or more reference images with the new current image.

2. The method of claim 1, wherein the one or more reference images further comprise:
a second reference image being at least one of a previously stored image of a last detected child seat mounted on the vehicle seat, another previously detected child seat mounted on the vehicle seat, or an example child seat in a similar vehicle.

3. The method of claim 2, wherein further reference images of the reference images are previously stored images of other child seats mounted on the vehicle seat.

4. The method of claim 1,
wherein the machine learning classification network is a neural network with a first input channel configured to receive the current image and one or more reference input channels each configured to receive a reference image of the one or more reference images, and
wherein the output of the neural network is a confidence score indicative of whether a child seat is mounted on the vehicle seat.

5. The method of claim 1, wherein the machine learning classification network is based on a Siamese neural network configured to compare the current image to the one or more reference images.

6. The method of claim 5, wherein the Siamese neural network is based on a plurality of convolutional neural networks that determine embeddings of the current image and the one or more reference images.

7. The method of claim 6, wherein the Siamese neural network was trained with a plurality of triples, wherein a triple comprises an anchor image, a positive match image, and a negative match image, wherein the triples comprise at least one of:
the anchor image is an example vehicle seat being occupied, the positive match image is the example vehicle seat being unoccupied, and the negative match image is the example vehicle seat with a mounted child seat being unoccupied;
the anchor image is an example vehicle seat with a mounted child seat being occupied, the positive match image is the example vehicle seat with the mounted child seat being unoccupied, and the negative match image is the example vehicle seat being unoccupied;
the anchor image is an example vehicle seat being unoccupied, the positive match image is the example vehicle seat being occupied, and the negative match image is the example vehicle seat with a mounted child seat being occupied; and
the anchor image is an example vehicle seat with a mounted child seat being unoccupied, the positive match image is the example vehicle seat with the mounted child seat being occupied, and the negative match image is the example vehicle seat being occupied.

8. The method of claim 7, wherein an image of a seat being occupied is a real image of the occupation by at least one of a child, an adult, or an object, or wherein an image of a seat being occupied is generated by modifying an image of an unoccupied seat to simulate an occupation.

9. The method of claim 6, wherein determining the seat state comprises:
determining one or more Euclidean distances between the embeddings of current image and the one or more reference images;
selecting a minimum value of the one or more Euclidean distances; and
in response to the minimum value of the Euclidean distance being smaller than a first threshold, determining that the respective reference image is a match, wherein the seat state is determined based on the match of the reference image.

10. The method of claim 9, wherein the Siamese neural network was trained with a plurality of triples, wherein a triple comprises an anchor image, a positive match image, and a negative match image, wherein the triples comprise at least one of:

the anchor image is an example vehicle seat being occupied, the positive match image is the example vehicle seat being unoccupied, and the negative match image is the example vehicle seat with a mounted child seat being unoccupied;

the anchor image is an example vehicle seat with a mounted child seat being occupied, the positive match image is the example vehicle seat with the mounted child seat being unoccupied, and the negative match image is the example vehicle seat being unoccupied;

the anchor image is an example vehicle seat being unoccupied, the positive match image is the example vehicle seat being occupied, and the negative match image is the example vehicle seat with a mounted child seat being occupied; and the anchor image is an example vehicle seat with a mounted child seat being unoccupied, the positive match image is the example vehicle seat with the mounted child seat being occupied, and the negative match image is the example vehicle seat being occupied.

11. The method of claim 10, wherein an image of a seat being occupied is a real image of the occupation by at least one of a child, an adult, or an object, or wherein an image of a seat being occupied is generated by modifying an image of an unoccupied seat to simulate an occupation.

12. The method of claim 1, wherein the Siamese neural network was trained with a plurality of triples, wherein a triple comprises an anchor image, a positive match image, and a negative match image, wherein the triples comprise at least one of:

the anchor image is an example vehicle seat being occupied, the positive match image is the example vehicle seat being unoccupied, and the negative match image is the example vehicle seat with a mounted child seat being unoccupied;

the anchor image is an example vehicle seat with a mounted child seat being occupied, the positive match image is the example vehicle seat with the mounted child seat being unoccupied, and the negative match image is the example vehicle seat being unoccupied;

the anchor image is an example vehicle seat being unoccupied, the positive match image is the example vehicle seat being occupied, and the negative match image is the example vehicle seat with a mounted child seat being occupied; and the anchor image is an example vehicle seat with a mounted child seat being unoccupied, the positive match image is the example vehicle seat with the mounted child seat being occupied, and the negative match image is the example vehicle seat being occupied.

13. The method of claim 12, wherein an image of a seat being occupied is a real image of the occupation by at least one of a child, an adult, or an object, or wherein an image of a seat being occupied is generated by modifying an image of an unoccupied seat to simulate an occupation.

14. The method of claim 1, wherein the method is initiated by the seat occupancy classification system in response to the seat occupancy classification system determining an uncertain state with regard to whether a person is seated on a mounted child seat.

15. The method of claim 1, wherein the seat occupancy classification system serves to control one or more safety systems in the vehicle, wherein the one or more safety systems comprises at least one of airbag regulation or seatbelt tensioning control.

16. A computing system comprising computer hardware components configured to:

receive a current image showing a region of a vehicle seat currently captured inside of a vehicle;

retrieve one or more reference images, wherein at least one reference image is a previously stored first reference image of the vehicle seat being unoccupied;

determine a seat state of the vehicle seat by:

processing the current image and one or more reference images with a pre-trained machine learning classification network, and determining, based on an output from the machine learning classification network, the seat state indicating at least whether the vehicle seat in the current image comprises a mounted child seat;

forward the seat state to a seat occupancy classification system; and in response to determining that no decision on the seat state is possible, store the current image as an updated image for a reference image update process;

wherein the reference image update process includes:

receiving a new current image, wherein the new current image depicts a vehicle seat without a mounted child seat being unoccupied or a vehicle seat with a mounted child seat being unoccupied;

applying a Siamese neural network to compare the new current image with the updated image; and in response to a Euclidean distance between embeddings of the new current image and the updated image being smaller than a second threshold, storing the new current image as one of the one or more reference images or replacing one of the one or more reference images with the new current image.

17. The computing system of claim 16, further comprising:

a vehicle including:

a camera for taking the current image; and the seat occupancy classification system.

18. A computer program product comprising instructions, which, when executed on a computer, cause the computer to:

receive a current image showing a region of a vehicle seat currently captured inside of a vehicle;

retrieve one or more reference images, wherein at least one reference image is a previously stored first reference image of the vehicle seat being unoccupied;

determine a seat state of the vehicle seat by:

processing the current image and one or more reference images with a pre-trained machine learning classification network, and determining, based on an output from the machine learning classification network, the seat state indicating at least whether the vehicle seat in the current image comprises a mounted child seat;

forward the seat state to a seat occupancy classification system; and in response to determining that no decision on the seat state is possible, store the current image as an updated image for a reference image update process;

wherein the reference image update process includes:

receiving a new current image, wherein the new current image depicts a vehicle seat without a mounted child seat being unoccupied or a vehicle seat with a mounted child seat being unoccupied;

applying a Siamese neural network to compare the new current image with the updated image; and in response to a Euclidean distance between embeddings of the new current image and the updated image being smaller than a second threshold, storing the new current image as one of the one or more reference images or replacing one of the one or more reference images with the new current image.

\* \* \* \* \*